United States Patent [19]

Dewitz

[11] Patent Number: 4,853,003
[45] Date of Patent: Aug. 1, 1989

[54] REMOVAL OF PARTICULATES FROM SYNTHESIS GAS

[75] Inventor: Thomas S. Dewitz, Houston, Tex.

[73] Assignee: Shell Oil Company, Houston, Tex.

[21] Appl. No.: 98,178

[22] Filed: Sep. 18, 1987

[51] Int. Cl.[4] .................................. B01D 45/12
[52] U.S. Cl. ............................. 55/20; 55/21;
 55/394; 55/429; 55/431; 55/459.1; 55/1;
 208/161; 48/128
[58] Field of Search .............. 55/1, 20, 21, 459 R,
 55/394, 20, 21; 48/128; 208/161

[56] References Cited

U.S. PATENT DOCUMENTS

| | | | |
|---|---|---|---|
| 3,179,471 | 4/1965 | Savage | 55/20 |
| 3,188,783 | 6/1965 | Savage | 55/20 |
| 4,455,220 | 6/1984 | Parker | 208/161 |
| 4,516,989 | 5/1985 | Mink et al. | 55/1 |
| 4,671,806 | 6/1987 | Stil et al. | 55/459.1 |
| 4,778,488 | 10/1988 | Koers | 55/394 |

Primary Examiner—Bernard Nozick

[57] ABSTRACT

A method and apparatus for removing fine particulates from gases, such as fly ash, from syngas, at high temperatures and pressure using a two-stage cyclonic separator-stripper.

20 Claims, 1 Drawing Sheet

REMOVAL OF PARTICULATES FROM SYNTHESIS GAS

RELATED APPLICATIONS

This invention is related to Assignee[s patent applications Ser. Nos. 098,161 and 098,180 filed Sept. 18, 1987.

BACKGROUND OF THE INVENTION

Conventional cyclonic separator-purging systems are directed towards separating particulates as catalyst from cracked hydrocarbons such as those disclosed in U.S. Pat. Nos. 4,572,780 and 4,581,205.

However, for particulates having a mean size diameter of about 3–60 microns such as is the case with the fly ash produced from a coal gasification process, conventional separator-purging systems would cause excessive elutriation of the flyash by the purge gas.

The present invention is directed towards overcoming this problem in the prior art.

Applicant is not aware of any prior art which, in his judgment as one skilled in this particular art, would anticipate or render obvious the present invention. However, for the purpose of fully developing the background of this invention, and establishing the state of requisite art, the following art is set forth: U.S. Pat. Nos. 4,510,021; 4,572,780; 4,397,738; 3,817,872; 2,784,803; 4,581,205 and 4,455,220.

SUMMARY OF THE INVENTION

The primary purpose of the present invention relates to separating fine particulates mixed with gas and stripping interstitial and adsorbed gases therefrom under elevated temperature and pressure conditions. In particular, this invention relates to separating and stripping synthesis gas, also referred to as syngas, mixed with flyash produced by a coal gasification reactor, hereinafter referred to as a gasifier.

Preferably, such an apparatus includes means for introducing the mixture into a first containing means, the first containing means having upper and lower portions, means for separating the mixture into two streams, a first stream being mostly particulates, and a second stream being mostly gas, means for stripping interstitial gas and adsorbed gases from the particles, means for controlling a temperature of the first stream in the first containing means, and means for discharging the first and second streams separately from the first containing means.

Preferably, a method for accomplishing this separation includes introducing the mixture into a first containing means, the first containing means having upper and lower portions, separating the mixture into two streams, a first stream being mostly particulates, and a second stream being mostly gas, stripping interstitial gas and adsorbed gases from the particles, controlling a temperature of the first stream in the first containing means, and discharging the first and second streams separately from the first containing means.

The various features of novelty which characterize the invention are pointed out with particularity in the claims forming a part of this disclosure. For a better understanding of this invention, its operating advantages and specific objects obtained by its uses, reference may be made to the accompanying drawings and descriptive matter in which there are illustrated preferred embodiments of the invention.

DESCRIPTION OF A PREFERRED EMBODIMENT

Figure 1:
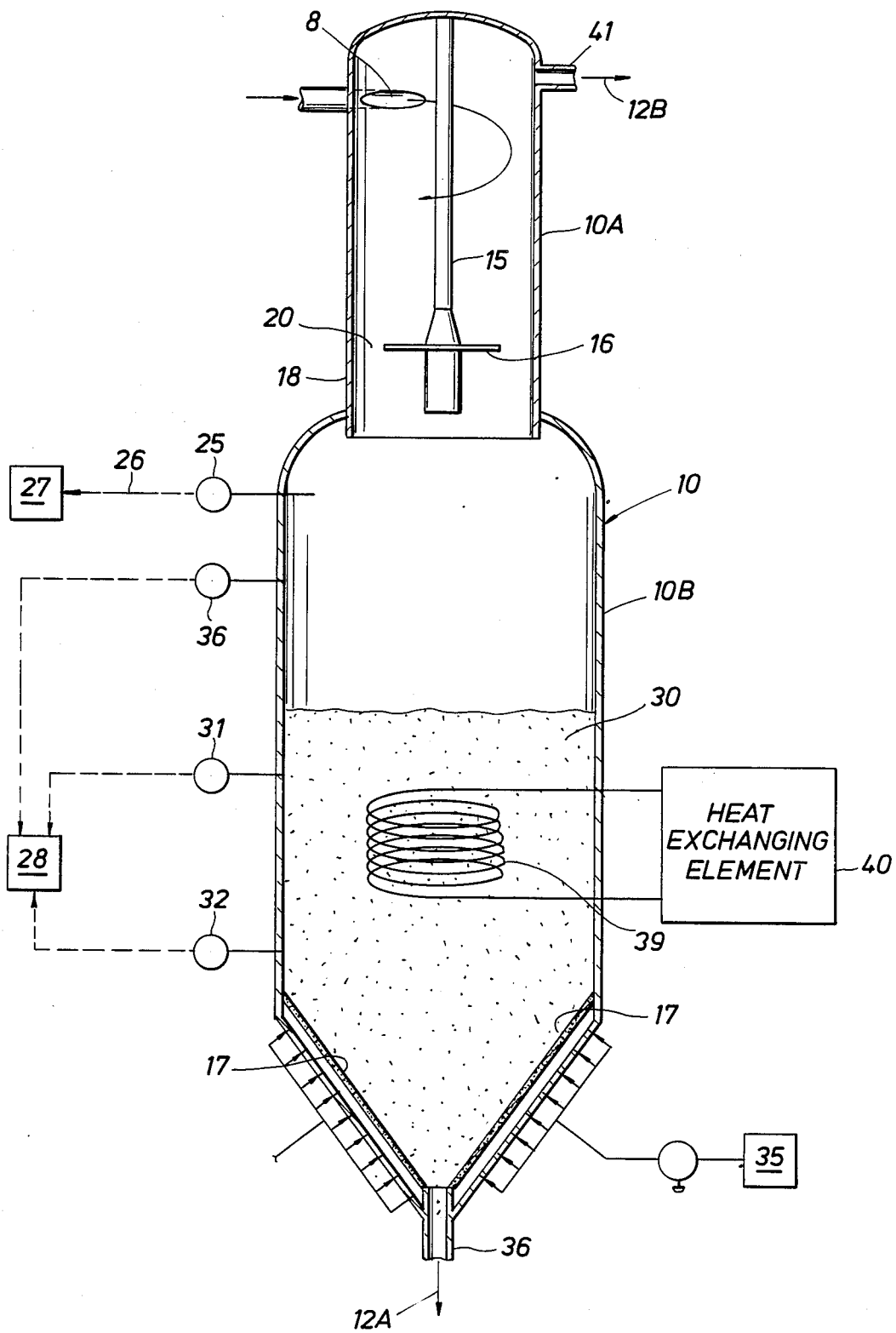
FIG. 1 illustrates a preferred embodiment of the invention.

Generation of synthesis gas occurs by partially combusting carbonaceous fuel, such as coal, at relatively high temperatures in the range of 800°–2000° C. and at a pressure range of from about 1–200 bars in the presence of oxygen or oxygen-containing gases in a gasifier. Steam, carbon monoxide, carbon dioxide and oxygen-containing gases including air, oxygen-enriched air, and oxygen are optionally diluted with nitrogen and/or other inert gases.

In the present invention, the fuel and gas mixture is discharged from a feed vessel apparatus, preferably having multiple outlets, each outlet being in communication with at least one burner associated with the gasifier. Typically, a gasifier will have burners in diametrically opposing positions. Generally, the burners have their discharge ends positioned to introduce the resulting flame and the agents of combustion into the gasifier.

Gasification of coal produces a gas, known as synthesis gas, that contains mostly carbon monoxide and hydrogen. Also produced are varying quantities of other gases, such as carbon dioxide and methane, and various liquid and solid materials, such as small particles of ash and carbon commonly known and collectively defined herein as flyash or flyslag. This flyash, because it is derived from a "reducing" atmosphere, tends to be different in composition and properties from flyash normally associated with combustion boilers where a fully oxidizing atmosphere is utilized. For example, the flyash from a process for partially combusing coal may contain elemental iron, sulfides, and deposited carbon, components not normally associated with boiler flyash.

The present invention particularly relates to removing fine particulate fly ash solids from synthesis gas under high temperatures and pressures to produce a gas stream which is sufficiently clean to be recycled to compressors or power recovery turbines. A combination of a vortex stabilizer within the cyclonic separator-stripper and small diameter exhaust for discharging the "clean" gas stream results in removal efficiencies of at least ninety percent which is required for compressors and turbines to avoid equipment deterioration due, in part, to solids in the gas stream.

An advantage of the present invention is the capability to remove fine particulate solids from a gaseous stream so that it is sufficiently clean to be recycled to compressors or power recovery turbines.

A further advantage of the present invention is the reduction in the amount and size of equipment needed to accomplish the above-mentioned particulates removal and thereby substantially simplifying the process configuration.

Another advantage is the reduction in energy consumption since nitrogen would otherwise be required to cool the flyash prior to discharging the flyash to possibly bag filters or some other form of tertiary treatment.

Although the invention is described hereinafter primarily with reference to pulverized coal and a gasifier, the method and apparatus according to the invention are also suitable for catalysts and other finely divided reactive solids which could be partially combusted, such as lignite, anthracite, bituminous, brown coal, soot, petroleum coke, and the like. Preferably, the size of solid carbonaceous fuel is such that 90 percent by weight of the fuel has a particle size smaller than No. 6 mesh (A.S.T.M.).

Having thus generally described the apparatus and method of the present invention, as well as its numerous advantages over the art, the following is a more detailed description thereof, given in accordance with specific reference to the drawings. However, the drawings are of process flow type in which auxiliary equipment, such as pumps, compressors, cleaning devices, etc. are not shown. All values are merely exemplary or calculated.

Referring to FIG. 1 of the drawing, an apparatus and method for separating fine particulates, such as flyash, mixed with synthesis gas and stripping interstitial and adsorbed gases therefrom under elevated temperature and pressure conditions generally includes means for introducing the mixture, such as inlet 8, preferably in tangential direction with respect to a first containing means, shown as vessel 10, into the upper portion 10A thereof.

The mixture of flyash and synthesis gas is preferably cyclonically separated into two streams. A first stream 12A being mostly particulates and a second stream 12B being mostly gas. The flyash is separated from the synthesis gas by forming a fluid vortex in the upper portion 10A of the vessel 10. A vortex stabilizer 15 and baffle 16 allow the separated flyash to flow downward while permitting a purge or stripping gas, such as nitrogen, carbon dioxide, or synthesis gas from source 35 to deflect upwardly around baffle 16.

A porous material 17 mounted at the lower portion 10B of the vessel 10 serves to distribute the gas injected from source 35 throughout a bed 30 of particulates contained in the lower portion 10B of the vessel. Gases having different densities, such as nitrogen and synthesis gas, may be injected into compartments in the lower portion 10B of the vessel as disclosed in Applicant's copending application Ser. No. 098,161 filed Sept. 18, 1987.

The separated flyash passes through an annulus 20 formed by a perimeter of the vortex baffle 16 and the walls 18 of the vessel 10, the upper portion 10A of the vessel 10 being in fluid communication with the lower portion 10B of the vessel 10. The annulus 20 is sufficiently wide to permit flyash to pass downwardly while simultaneously passing the stripping gas from the lower portion 10B around the vortex baffle 16 to the upper portion 10A of the vessel 10.

When the stripping gas contacts the flyash passing downwardly through the annulus, interstitial, i.e. physically entrained gases, are purged from the flyash. Below the annulus 20 the flyash falls into a fluidized bed 30 where adsorbed gases are stripped from the flyash.

Controlling the temperature of the first stream 12A is desirable to permit easier handling and transportation of the flyash for disposal.

The temperature of the first stream 12A is preferably controlled by determining a temperature of the mixture of flyash and synthesis gas in the vessel 10, say using thermocouple 25, transmitting a signal, shown for ease of illustration as dashed line 26 to a processor-controller 27, comparing the determined temperature with a selected temperature via the controller 27, and adjusting a height of the particulates forming the bed 30 in the lower portion 10B of the vessel 10.

The height of the bed 30 in vessel 10 may be adjusted by determining the differential pressure within the bed 30 in the lower portion 10B of the vessel 10, say using pressure transducers 31 and 32 in communication with processor-controller 28. The pressure within the lower portion 10B of the vessel 10 above the bed 30, say using pressure transducer 36 which is also in communication with controller 28, is compared with the determined differential pressure within the bed 30 in the lower portion 10B of the vessel 10 to obtain the height of the bed 30 in the lower portion 10B of the vessel 10. After determining the height of the bed 30, the height of the bed and hence the temperature of the first stream 12A can then be adjusted by manipulating the temperature and/or flow of the gas injected from source 35.

Additionally or alternatively, the bed 30 can be cooled using cooling coils 39 connected to heat exchanging element 40 or in any other manner well known to the art. However, as previously mentioned, additional injection of gas beyond that needed to strip interstitial and adsorbed gases from the flyash is undesirable because it causes excessive elutriation of the flyash which in turn results in entrainment of the flyash in the synthesis gas.

The purged flyash is subsequently discharged through outlet 36 and is further cleaned and/or disposed of in an environmentally acceptable manner.

The second stream 12B, containing about 10 percent or less of the solids originally contained in the mixture introduced to the vessel 10, is discharged through a small diameter, outlet 41 to power recovering means such as compressors and turbines.

Although the system for separating flyash from syngas is shown in FIG. 1 in its distributed form as discrete components, it would be readily understood by those skilled in the art that these components could be combined into a single unit or otherwise implemented as may be most convenient for the particular application at hand. Furthermore, although the preferred embodiment has been shown as using an electronic process control system, it is also understood by those skilled in the art that the present invention could be effected using manual controls.

The foregoing description of the invention is merely intended to be explanatory thereof, and various changes in the details of the described method and apparatus may be made within the scope of the appended claims without departing from the spirit of the invention.

What is claimed is:

1. An apparatus for separating fine particulates mixed with gas and stripping interstitial and adsorbed gases therefrom under elevated temperature and pressure conditions, said apparatus comprising:

means for introducing said mixture tangentially into the upper portion of a first containing means having upper and lower portions;

means for cyclonically separating said mixture into two streams, a first stream being mostly particulates, and a second stream being mostly gas, said means for separating said mixture includes means for forming a fluid vortex in the upper portion of said first containing means, vortex stabilizing means, means for passing the separated particulates through an annulus formed by a perimeter of the stabilizing means and said first containing means into the lower portion of said first containing means said lower portion being in fluid communication with the upper portion of said first containing means, said annulus being sufficiently wide to permit particulate passage downwardly while simultaneously passing a stripping gas in an upward direction;

means for contacting said particulates with said stripping gas as said particulates pass downwardly through said annulus to strip interstitial and adsorbed gases therefrom;

means for controlling a temperature of said first stream in said first containing means, said means for controlling the temperature includes means for determining a temperature of said mixture, means for comparing the determined temperature with a selected temperature, and means for adjusting a height of said particulates forming a bed in the lower portion of said first containing means including means for determining differential pressure within said lower portion of said first containing means, means for determining pressure within the lower portion of said first containing means above said bed, means for comparing the determined pressures to determine the height of said bed in the lower portion of said first containing means;

means for injecting a gas under pressure into said lower portion of said first containing means, said means for injecting gas includes a porous material at the lower portion of said first containing means through which the gas is injected to distribute said gas throughout said bed contained in said lower portion of said first containing means, said gas having more than one component, said components having different densities;

cooling means located at the lower portion of said first containing means for cooling said particulates; and means for discharging said first and second streams separately from said first containing means, said means for discharging said second stream being a small diameter outlet.

2. An apparatus for separating fine particulates mixed with gas and stripping interstitial and adsorbed gases therefrom under elevated temperature and pressure conditions, said apparatus comprising:

means for introducing said mixture tangentially into a first containing means, said first containing means having upper and lower portions;

means for separating said mixture into two streams, a first stream being mostly particulates forming a bed in said containing means prior to discharge therefrom, and a second stream being mostly gas;

means for stripping interstitial and adsorbed gases from said particles;

means for measuring a temperature of said first stream in said first containing means and controlling said temperature by adjusting the height of said particulate bed; and means for discharging said first and second streams separately from said first containing means, said means for discharging said second stream being a small diameter outlet.

3. The apparatus of claim 2 wherein said means for controlling temperature includes cooling means located at the lower portion of said first containing means for cooling said particulates.

4. The apparatus of claim 2 wherein said means for separating said mixture includes means for cyclonically-separating said mixture.

5. The apparatus of claim 2 wherein said means for separating said mixture includes: means for forming a fluid vortex in the upper portion of said first containing means, means for stabilizing the fluid vortex, means for passing the separated particulates through an annulus formed by a perimeter of the stabilizing means and said first containing means into the lower portion of said first containing means being in fluid communication with the upper portion of said first containing means, said annulus being sufficiently wide to permit particulate passage downwardly while simultaneously passing a stripping gas in an upward direction.

6. The apparatus of claim 2 wherein said means for controlling the temperature includes: means for determining a temperature of said mixture, means for comparing the determined temperature with a selected temperature, and means for adjusting a height of said first stream in the lower portion of said first containing means.

7. The apparatus of claim 6 wherein said means for adjusting said height of said first stream includes: means for determining differential pressure within said lower portion of said first containing means, means for determining pressure within the upper portion of said first containing means, means for comparing the determined pressures to determine the height of said first stream in the lower portion of said first containing means, and means for comparing the determined height with a preselected height.

8. The apparatus of claim 2 including means for injecting a gas under pressure into the lower portion of said first containing means to fluidize a bed formed by the particulates therein.

9. The apparatus of claim 8 wherein said means for injecting gas includes a porous material at the lower portion of said first containing means through which gas is injected to distribute said gas throughout said fluidized bed.

10. A method for separating fine particulates mixed with gas and stripping interstitial and adsorbed gases therefrom under elevated temperature and pressure conditions, said method comprising:

introducing said mixture tangentially into the upper portion of a first containing means having upper and lower portions;

cyclonically separating said mixture into two streams, a first stream being mostly particulates, and a second stream being mostly gas, said separating said mixture includes forming a fluid vortex in the upper portion of said first containing means, vortex stabilizing means, passing the separated particulates through an annulus formed by a perimeter of the stabilizing means and said first containing means into the lower portion of said first containing means said lower portion being in fluid communication with the upper portion of said first containing means, said annulus being sufficiently wide to permit particulate passage downwardly while simultaneously passing a stripping gas in an upward direction;

contacting said particulates with said stripping gas as said particulates pass downwardly through said annulus to strip interstitial and adsorbed gases therefrom;

controlling a temperature of said first stream in said first containing means, said controlling the temperature includes determining a temperature of said mixture, comparing the determined temperature with a selected temperature, and adjusting a height of said particulates forming a bed in the lower portion of said first containing means including determining differential pressure within said lower portion of said first containing means, determining pressure within the lower portion of said first containing means above said bed, comparing the determined pressures to determine the height of said bed in the lower portion of said first containing means;

injecting a gas under pressure into said lower portion of said first containing means, said injecting gas includes a porous material at the lower portion of said first containing means through which the gas is injected to distribute said gas throughout said bed contained in said lower portion of said first containing means, said gas having more than one component, said components having different densities;

cooling means located at the lower portion of said first containing means for cooling said particulates; and discharging said first and second streams separately from said first containing means, said second stream being discharged through a small diameter outlet.

11. A method for separating fine particulates mixed with gas and stripping interstitial and adsorbed gases therefrom under elevated temperature and pressure conditions, said method comprising:

introducing said mixture tangentially into a first containing means, said first containing means having upper and lower portions;

separating said mixture into two streams, a first stream being mostly particulates forming a bed in said containing means prior to discharge therefrom, and a second stream being mostly gas;

stripping interstitial and adsorbed gases from said particles;

controlling a temperature of said first stream in said first containing means by adjusting the height of said particulate bed; and discharging said first and second streams separately from said first containing means, said second stream being discharged through a small diameter outlet.

12. The method of claim 11 wherein said controlling temperature includes cooling means located at the lower portion of said first containing means.

13. The method of claim 11 wherein said separating said mixture includes cyclonically-separating said mixture.

14. The method of claim 11 wherein said separating said mixture includes: forming a fluid vortex in the upper portion of said first containing means, stabilizing the fluid vortex, passing the separated particulates through an annulus formed by a perimeter of the stabilizing means and said first containing means into the lower portion of said first containing means being in fluid communication with the upper portion of said first containing means, said annulus being sufficiently wide to permit particulate passage downwardly while simultaneously passing a stripping gas in an upward direction.

15. The method of claim 14 wherein said stripping interstitial gas adsorbed to said particulates includes contacting said particulates with stripping gas as said particles pass downwardly through said annulus.

16. The method of claim 11 wherein said controlling the temperature includes: determining a temperature of said mixture, comparing the determined temperature with a selected temperature, and adjusting a height of said first stream in the lower portion of said first containing means.

17. The method of claim 16 wherein said adjusting said height of said first stream includes: determining differential pressure within said lower portion of said first containing means, determining pressure within the upper portion of said first containing means, comparing the determined pressures to determine the height of said first stream in the lower portion of said first containing means, and comparing the determined height with a preselected height.

18. The method of claim 11 including injecting a gas under pressure into the lower portion of said first containing means to fluidize a bed formed by the particulates therein.

19. The method of claim 18 wherein said injecting gas includes a porous material at the lower portion of said first containing means through which gas is injected to distribute said gas throughout said fluidized bed.

20. The method of claim 19 wherein said gas has more than one component, said components having different densities.

* * * * *